Feb. 6, 1940.  A. C. WALDVOGEL  2,188,969
COFFEE ROASTING APPARATUS
Filed March 31, 1937  4 Sheets-Sheet 4

Inventor
Albert C. Waldvogel
by Rippey & Cassidy
His Attorneys

Patented Feb. 6, 1940

2,188,969

UNITED STATES PATENT OFFICE 2,188,969

COFFEE ROASTING APPARATUS

Albert C. Waldvogel, Richmond Heights, Mo.

Application March 31, 1937, Serial No. 133,942

18 Claims. (Cl. 34—5)

This invention relates to coffee roasting apparatus.

Objects of the invention are to provide an improved coffee roasting apparatus comprising electrically controlled mechanisms operating in a timed sequential relationship for delivering measured charges of coffee from a hopper or receptacle into a receiver and thence into a rotary roaster; to provide additional mechanism controlling and effecting discharge of the coffee from the roaster into a cooling compartment through which a cooling draft of air is drawn to cool the roasted coffee while the coffee remains in said cooling compartment; to provide mechanism for causing a draft of air through the cooling compartment only while the coffee remains in the cooling compartment; to provide means for discharging the coffee from the cooling compartment into a stoner or cleaning device and utilizing the aforesaid air draft mechanism to create a current or suction of air through the stoner or cleaner with sufficient force to raise the coffee to a desired height and to discharge the coffee against the baffle which deflects the coffee into a discharge receptacle but permits the impurities, such as chaff, etc., to continue with the flow of the current of air to a discharge to the air draft mechanism, from which it is discharged to the outside or to waste; to provide automatic means for controlling the passage of a supply of fuel to a burner adjacent to the roaster; to provide an additional air draft mechanism for withdrawing air and the lighter particles of waste or chaff from the roaster compartment in which the rotary roaster is contained and to discharge the chaff into an appropriate receptacle and the fumes to the outside; and to provide improved means for controlling a thermostatic valve that regulates the passage of fuel to the burner adjacent to or at the roaster.

Another object of the invention is to provide improved mechanisms operating dependently and in a timed relationship so that the machine or apparatus will operate with a very high degree of efficiency and will continue to operate only while an appropriate amount of coffee is contained in the supply hopper or receptacle and will automatically stop and cease to operate when the supply hopper or receptacle becomes depleted or contains less than the desired amount of green coffee.

Various other objects and advantages of this invention, which are attained by the mechanisms and devices herein disclosed, and all of which are considered of importance in this invention, will become readily apparent from the following description, reference being made to the annexed drawings, in which—

Fig. 2 is a view looking toward the righthand side of Fig. 1.

Fig. 3 is an enlarged detailed view showing the switch devices controlled in part by the coffee contained in the supply hopper or receptacle for energizing the electrical mechanism for operating the machine.

Fig. 19 (Sheet 2) is a detail view showing the construction preventing the lodgment of coffee beans between the edge of the gate valve member for the roaster and the wall of the opening controlled by said gate valve member when said gate valve member is swung from position to discharge roasted coffee from the roaster.

Most of the present invention is enclosed within or supported by a casing 1 (Fig. 7) having a hopper or receptacle 2 thereon to receive the green coffee that is to be roasted, and also having at one side a receptacle or bin 3 which receives the roasted and cleaned coffee from a delivery chute 4 opening from within the casing 1. The hopper or receptacle 2 has an inclined wall 5 which partly supports the coffee in the hopper and which has an opening 6 therethrough (Figs. 2 and 3). A plate 7 is provided to close said opening and has its upper end mounted on a pivot 8 so that said plate may swing upwardly to the position shown in Fig. 1 when the hopper 2 is empty and downwardly to the position shown in Fig. 4 when the hopper 2 contains a considerable amount of coffee. The edges of said plate 7 are connected with the wall 5 by flexible fabric 9 or the like, which does not interfere with the swinging movements of the plate 7 but prevents coffee beans and the like from becoming wedged or lodged between the edges of the plate 7 and the bottom wall 5, and also prevents the coffee beans from dropping through the opening 6. An angular lever 10 has one end attached to the underside of the plate 7 and its opposite end supporting a counterweight 11. The lever 10 engages a part 12 mounted on a pivoted frame 13 supporting a pair of mercury switches 14 and 15.

Figures 1, 5:
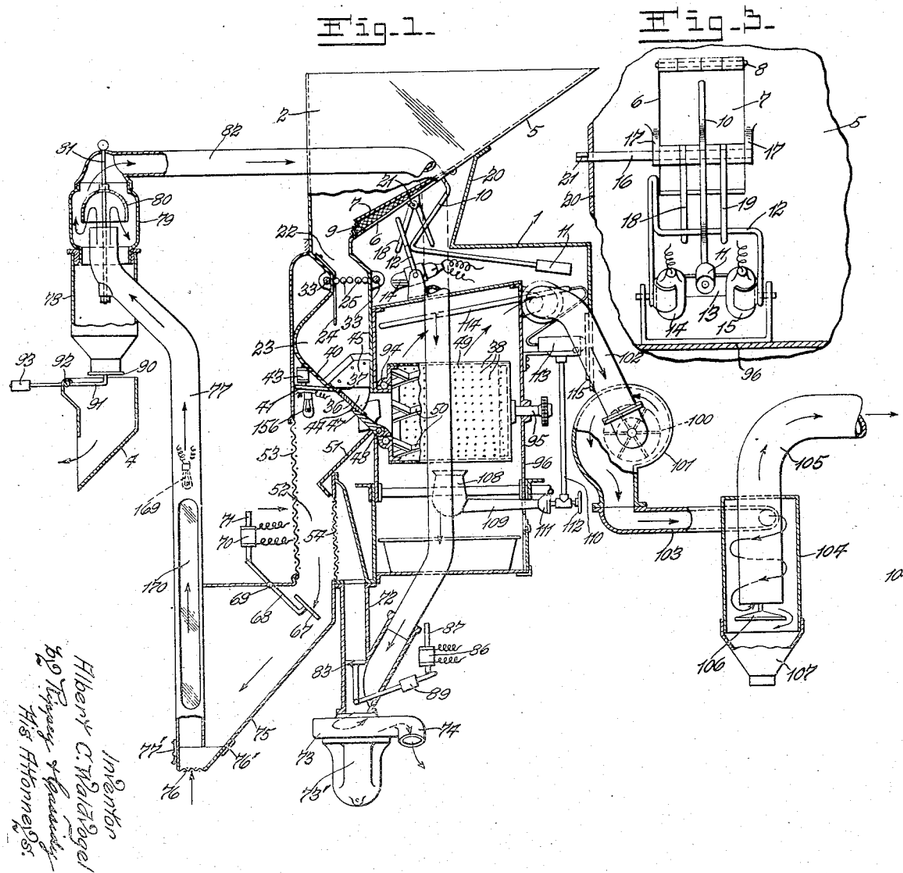
Fig. 1 is a view with parts in section and parts in elevation and extended in offset relationship illustrating many of the important features of the invention.
Fig. 5 is a view similar to Fig. 4 showing the parts in position for discharging coffee from the receiving compartment into the roaster and for supporting coffee in the cooling compartment.

When the hopper 2 contains no coffee to be roasted or has become empty, or approximately empty, the switch actuator comprising the lever 10 and the counterweight 11 turns the frame 13 to position to open both mercury switches 14 and 15, as shown in Fig. 1. When the plate 7 is depressed from the position shown in Fig. 1 to the position shown in Fig. 4 under the weight of the coffee contained in the hopper 2, the lever 10 is moved from the position shown in Fig. 1 to the position shown in Fig. 4, so that the frame 13 may be turned to close the switches 14 and 15 without resistance by the lever 10.

A rod 16 is supported for rocking movements by lugs 17 attached to the bottom wall 5 of the hopper, and has attached thereto an arm 18 at one side of the part 12 and an arm 19 at the opposite side of said part 12. The rod 16 extends adjacent to or through one wall 20 of the hopper supporting structure and has a portion 21 (Fig. 3) formed to be engaged by a key or the like, whereby the rod 16 may be turned to operate the part 12 and thereby swing the frame 13 from a position in which the switches 14 and 15 are open to position in which said switches are closed, and vice versa. It is necessary to close the switches 14 and 15 in order to operate the machine.

An inlet chute 22 from the hopper 2 opens into a receiving compartment 23 into which measured amounts of green coffee are delivered at intervals and from which said measured amounts of green coffee are discharged at intervals automatically during operation of the machine while the switches 14 and 15 remain closed. A plate 24 supported by one wall of the chute 22 (Figs. 1 and 9) and which is removable and replaceable, constitutes a device regulating the capacity of the compartment 23. Thus, if it is desired to increase the capacity of the compartment 23, the specific plate 24 shown in the drawings may be removed and another plate of less length than the plate 24 and extending a lesser distance into the compartment 23 may be substituted therefor; and, if it is desired to reduce the capacity of the compartment 23, a longer plate may be substituted for the plate 24. The capacity of the compartment 23 may be regulated in this way because no substantial amount of coffee will rise behind the plate 24, which is to say between said plate and the adjacent wall of the compartment 23.

The chute 22 is opened and closed by a gate or valve device comprising a series of rods 25 (Figs. 4 and 9) extending through one wall of the chute 22 across said chute toward the opposite wall and terminating under a shoulder or ledge 26 having a horizontal underside and a downwardly and inwardly inclined upper wall. The inner ends 27 of the rods 25 are pointed so that no coffee beans can become lodged between the ends of said rods and the wall of the chute adjacent to which said rods terminate, because the pointed ends 27 cooperate with the shoulder 26 to prevent such lodgment of the coffee beans. The outer ends of the rods 25 extend through holes in the wall of the chute and are attached to a cross-head 28 having an arm 29 pivoted to an extended portion of an armature 30 of an electromagnet 31. A yoke 32 (Fig. 18) is attached to the outer end of the magnet 31. Two rods 33 are fixed in supports 34 and have their outer ends extending through the yoke 32. Springs 35 encircle the rods 33 and have their outer ends abutting against the yoke 32 and their inner ends abutting against the cross-head 28, so that the energy of said springs is exerted to move the cross-head 28, and thereby the armature 30, inwardly in opposition to the energy of the electro-magnet 31. When the electro-magnet 31 is energized, it moves the armature 30 outwardly and thereby moves the rods 25 outwardly to open position. And, when the electro-magnet 31 is de-energized, the springs 35 move the cross-head 28 and rods 25 inwardly to close the chute 22 and cut through the column of coffee beans extending from the hopper 2 to the bottom of the compartment 23. The rods 25 also support the beans in the hopper 2 while the beans are being discharged from the compartment 23 into the roaster. These operations are intermittent.

Figures 7, 8, 9, 10, 11, 13:
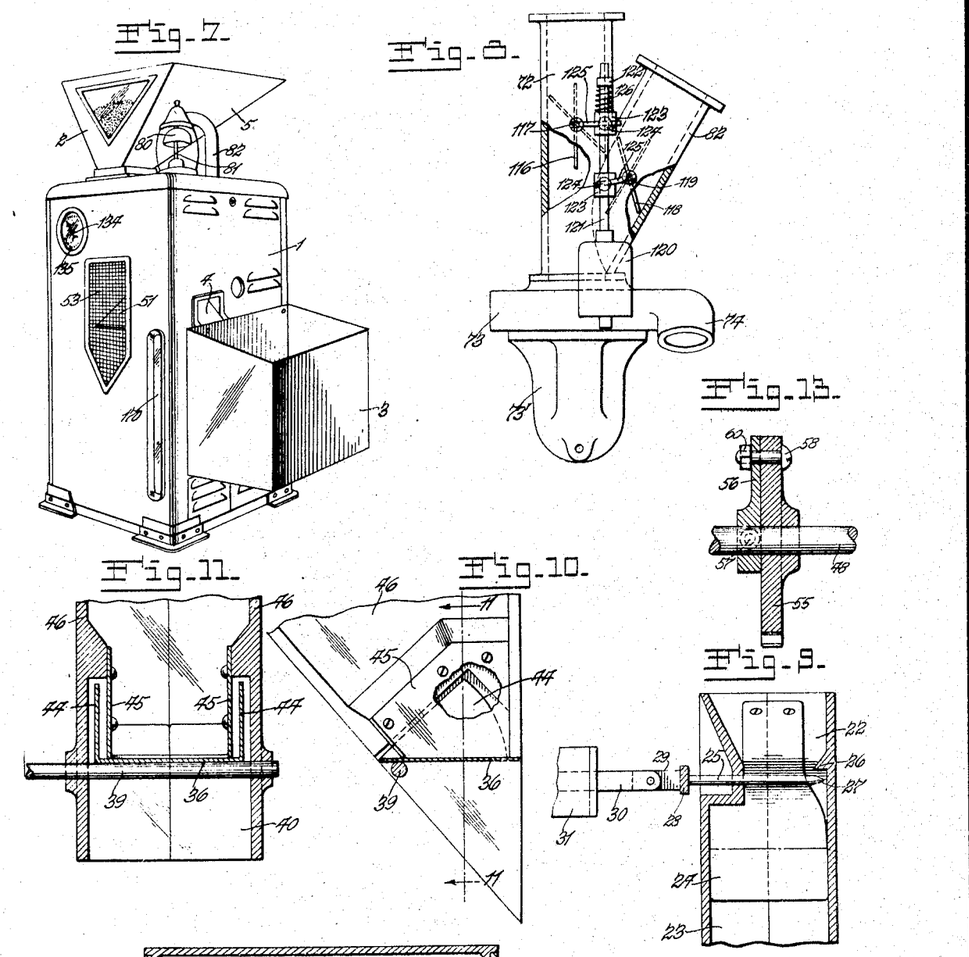
Fig. 7 is a perspective view of a completed machine embodying the present invention.
Fig. 8 is a view partly in section showing butterfly valves for controlling the suction of air through the cooling compartment and through the stoner or cleaner successively and alternately by the same mechanism.
Fig. 9 is an enlarged sectional view showing the device for controlling discharge of measured quantities of coffee from the hopper or container into the receiving compartment preparatory for delivery into the roaster.
Fig. 10 is a view partly in section showing details of the valve controlling discharge of coffee from the receiving compartment into the roaster.
Fig. 11 is a sectional view on the line 11—11 of Fig. 10.

After a predetermined quantity or amount of coffee beans have passed into the compartment 23, the electromagnet 31 is de-energized in a timed relationship with respect to the remaining mechanisms of the invention, thereby operating or moving the rods 25 inwardly to closed position, as described and as shown in Fig. 9 of the drawings.

A gate or valve 36 mounted on a pivot 37 is movable from position to close the lower end of the compartment 23 (Figs. 4 and 6) to position to open said compartment 23 (Figs. 1 and 5). In the closed position (Figs. 4 and 6) the measured amount of coffee delivered into and received within the compartment 23 will be supported in said compartment by the gate or valve 36; and, when the gate or valve 36 is moved from the closed position shown in Figs. 4 and 6 to the open position shown in Figs. 1 and 5, the coffee may pass from the compartment 23 through the space provided by opening of the gate or valve 36 into a rotary roaster 38.

One end of the gate or valve 36 is attached to a rocking rod 39 at the inclined wall 40 of the compartment 23, so that, when said gate or valve swings downwardly, it is in approximate continuation of the inclined wall 40, thereby permitting the coffee to slide along the wall 40 and through the opening provided by the gate or valve 36 and thence into the rotary roaster 38. An arm 41 projecting from the rocking rod 39 is engaged by the armature 42 of an electro-magnet 43 so that, when the electro-magnet 43 is de-energized and the armature 42 moves downwardly against the arm 41, it will support the valve 36 in closed position (Figs. 4 and 6); and, when the electro-magnet 43 is energized, which occurs at the proper time to deliver an additional charge or quantity of green coffee into the roaster 38, the armature 42 will move said gate or valve to open inclined position (Figs. 1 and 5), and thereby permit the coffee to flow into the roaster.

The gate or valve 36 has an upwardly extended side wall 44 attached to or integral with each side edge thereof (Figs. 10 and 11) and operating between plates 45 attached to the side walls 46 of the compartment 23, so that it is impossible for any of the coffee beans to become lodged or wedged between the gate or valve 36 and adjacent parts and thereby interfere with or prevent effective operation of said gate or valve. When the gate or valve is swung downwardly, these side walls 44 guide the flowing coffee beans between them.

A gate valve member 47 is attached to a rocking rod 48 mounted in stationary supports across the lower side of the inlet 49 into the roaster 38. The rocking rod 48 is adapted to be turned to three different positions and thereby move the gate valve member 47 to three different positions. The gate valve member 47 is shown in its intermediate position in Fig. 4, and it occupies this position during the time that a charge of coffee within the roaster 38 is being roasted. After the coffee has been retained in the rotary roaster 38 and roasted the proper length of time, the rod 48 is operated to swing the gate valve member 47 laterally to an inclined position in which it extends through the inlet 49 into the roaster 38. The flights 50 attached to the inside of the roaster are arranged and inclined in such a manner that they will discharge the coffee from the roaster onto the inclined gate valve member 47 and thence through the inlet 49, which is now utilized as an outlet for the roasted coffee. The coffee then moves downwardly along an inclined wall 51 into a cooling compartment 52 having opposite side walls 53 and 54 of screen material or the like through which air may be drawn or forced to cool the coffee supported within the cooling compartment.

After the roasted coffee has been discharged from the rotary roaster 38, the gate valve member 47 is swung in the opposite direction to the inclined position shown in Fig. 5, in which it is in approximate alinement with the inclined wall 40 of the receiving compartment 23. Then the valve member 36 is swung downwardly as before indicated and overlaps the gate valve member 47 and cooperates therewith to form a chute into and through the combined inlet and outlet passage 49 to deliver a charge of green coffee into the roaster 38. At the proper time after the charge of green coffee has passed from the compartment 23 into the roaster 38, the valve 36 is closed and the rod 48 is turned to move the member 47 to vertical position across the opening 49 (Fig. 4) to prevent coffee contained in the roaster from being discharged therefrom until it has been roasted.

When the gate valve member 47 is operated in the manner described, it is desirable to prevent any of the coffee beans from becoming lodged between the far edge of said gate valve member as seen in Fig. 19 and the marginal portion 47' of the opening controlled by said gate valve member. For this purpose, I provide a flange 48' with a sharp upper edge so that no coffee beans can become lodged on said flange. This flange is integral or rigid with the marginal portion of the gate valve member 47 close to the margin 47' of the opening controlled by said gate valve member. Thus, the flange 48' makes it impossible for any coffee bean or beans to become lodged at the corner formed by the gate valve member 47 and the margin 47' of the opening when said gate valve member is inclined into the roaster, as shown in Fig. 19. Thus, proper operation of the gate valve member is assured.

The mechanism for rocking the rod 48 comprises gearing and operating devices therefor. As shown (Figs. 12 and 13), a pinion 55 is loosely and adjustably mounted on the rod 48. An arm 56 is loosely mounted on the rod 48 at the side of the pinion 55. A set screw 57 is screwed through the arm 56 into clamping engagement with the rod 48, so that the arm 56 may be rigidly attached to the rod. A bolt 58 passes through a hole in the pinion 55 and through a slot 59 in the arm 56, and has a nut 60 screwed on the end thereof. By loosening the nut 60 the rod 48, and thereby the valve member 47, may be turned to any desired adjusted position with respect to the pinion 55 and vice versa; and the nut 60 may then be tightened to secure the parts rigidly in such adjusted position.

Figure 12:
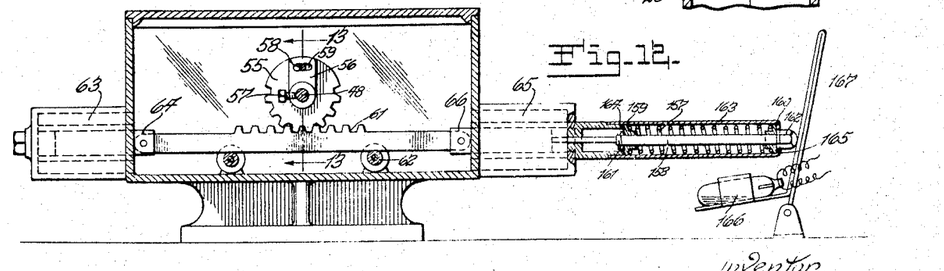
Fig. 12 is an enlarged detailed view partly in section showing the mechanism for operating the device that controls discharge of coffee from the roaster into the cooling compartment and that cooperates with the valve of the receiving compartment to discharge coffee from the receiving compartment into the roaster.

A rack 61 mounted on anti-friction supports 62 is operated to turn the pinion 55 and the rod 48 to move the member 47 to its three different positions before indicated. The gearing as shown in Fig. 12 is in its intermediate position and holds the member 48 in its intermediate position shown in Fig. 4 during the time that the coffee is being retained in the roaster and is being roasted. After the coffee has been roasted the desired time, an electromagnet 63 is energized and actuates its armature 64, which is pivoted to the adjacent end of the rack 61, thereby moving the rack and turning the rod 48 to swing the member 47 laterally to the position in which its extends into the end of the rotary roaster 38 and provides a chute onto which the roasted coffee is discharged from the roaster by the flights 50. After the roasted coffee has been discharged from the roaster, the magnet 63 is de-energized and another electromagnet 65 is energized and moves its armature 66 which is pivotally connected with the rack 61. Thereby the rack 61 is moved in the opposite direction from the direction in which it had been moved by the armature 63 and operates the rod 48 to swing the member 47 outwardly and to the inclined position shown in Fig. 5 preparatory for opening of the valve member 36. These parts are operated in timed relationship, and at the proper time the valve member 36 is swung downwardly to cause another charge of green coffee to flow into the roaster 38.

The lower end of the cooling chamber 52 is open, but may be closed by a movable wall 67 supported by a lever 68 mounted on a pivot 69. An electro-magnet 70 has an armature 71 which engages the lever 68. When the electro-magnet 70 is de-energized, the armature 71 moves downwardly and operates the lever 68 to move the wall 67 from open position (Fig. 4) to closed position (Figs. 5 and 6). The electro-magnet 70 is energized intermittently. It is de-energized before roasted coffee is discharged from the rotary roaster 38 in the manner described, and thereby moves the wall 67 to closed position at the lower end of the cooling compartment 52 (Fig. 6) and holds said wall in said closed position a desired length of time while a current of cooling air is being drawn through the wall 53 and through the coffee in the cooling chamber 52 and through the wall 54 into a passage 72 opening into a blower 73 having a discharge outlet 74 through which the air drawn into the blower is discharged.

When the wall 67 is opened as explained, the roasted and cooled coffee drops from the cooling chamber 52 into a stoner chamber 75 which has a screen cup 76. A pipe 77 extends downwardly into the chamber 75 and has its lower end opening into said chamber immediately above the screen bottom wall of the cup 76. The cup 76 is supported by a hinge 76' and a conventional latch 77'. The pipe 77 extends upwardly through a chamber 78 and has its upper end open within a compartment 79 supported by and opening downwardly into the chamber 78. A bell-shaped baffle 80 is supported immediately above the open upper end of the pipe 77 by an appropriate support 81 (Fig. 1) extending into the compartment 79. The bell-shaped baffle 80 is of larger diameter than the diameter of the pipe 77 and is of less diameter than the inside diameter of the compartment 79 so that said baffle and the wall of said compartment cooperate to form an annular space around the baffle and into the upper portion of the compartment 79 which open into a pipe 82 extending downwardly and opening into the blower 73. A valve 83 is supported by the upper end of a stem 84 the lower end of which is attached to a rocking rod 85 extending across the passage from the pipes 72 and 82 into the blower 73. An electro-magnet 86 has its armature 87 provided with a pivotal and sliding connection 87', with a lever 88 attached to the rod 85 so as to rock said rod far enough to move the valve 83 from position to close the pipe 72 (Fig. 4) to position to close the pipe 82 (Figs. 5 and 6), and vice versa. A counterweight 89 on the lever 88 cooperates with the armature 87 to move the valve 83 from the pipe 72 to the pipe 82 when the electro-magnet 86 is de-energized. The electro-magnet 86 remains de-energized during the entire time that roasted coffee is supported in the cooling compartment 52 by the wall 67; and the electro-magnet 86 is energized simultaneously with the energizing of the magnet 70, so that the pipe 82 is opened and the pipe 72 is closed simultaneously with the opening of the closure wall 67 at the lower end of the cooling compartment 52. Obviously, then, the blower 73 will create a suction through the pipe 82 and thence through the pipe 77 from the stoner compartment 75 and will raise the roasted cooled coffee through the pipe 77 and discharge the same against the baffle 80. The cooled coffee will then drop into the chamber 78 while the air and chaff will be drawn by suction through the pipe 82 and discharged by the blower through the outlet 74. This leaves the heavier particles and stones in the removable screen cup 76 at the bottom of the stoner compartment 75.

In proper timed relationship to the movement of the wall 67 to open position (Fig. 4), which permits the cool roasted coffee to drop or flow from the cooling chamber 52 into the stoner 75, the electro-magnet 86 is energized and turns the rod 85 to position to swing the valve 83 from the pipe 82 to position to close the pipe 72 (Fig. 4), thus opening the pipe 82 so that the continuously operating blower 73 will create a strong suction through the pipe 77 and will raise the coffee from the stoner chamber 75 through said pipe 77 and discharge the coffee against the bell-shaped baffle 80 (Fig. 1), which deflects the coffee downwardly into the chamber 78 while the air and any remaining light waste matter, such as chaff, will be drawn through the pipe 82 by the continuously operating blower and discharged through the outlet 74.

The cooled and cleaned roasted coffee will be supported in the chamber 78 by a movable closure wall 90 (Fig. 1) for the bottom of said chamber, which is supported by a lever 91 mounted on a rod 92 and actuated to closed position by a counterweight 93 attached to said lever and by the suction of air as described. After the charge or batch of cleaned and cooled roasted coffee has been delivered into the chamber 78 in this manner, and after the pipe 82 has been closed by the valve 83 and suction through the pipe 82 has ceased, the closure wall 90 will operate by the weight of the coffee to open the lower end of the chamber 78 and cause the coffee to pass or flow from the chamber 78 into the discharge chute 4 and thence into the receptacle or bin 3.

Figures 4, 20:
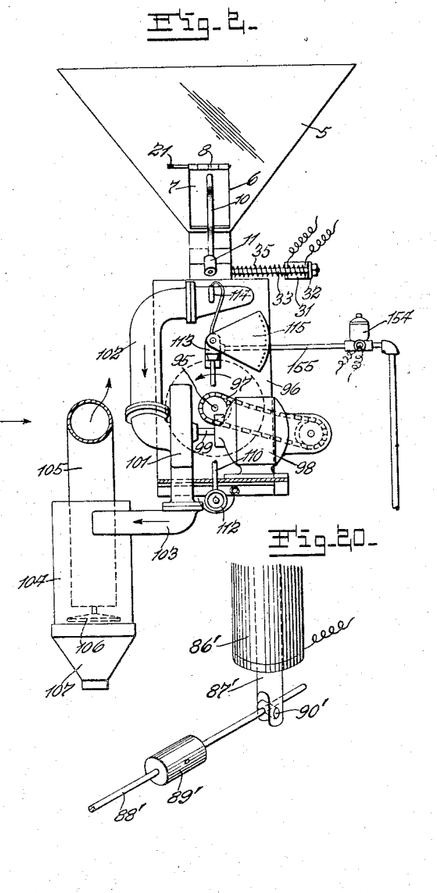
Fig. 4 is a view partly in section showing a portion of the invention illustrated in Fig. 1 but having a quantity of green coffee in the supply hopper or receptacle preparatory for delivering a measured quantity thereof into a receiving compartment for delivery into the roaster, with other parts shown in position to discharge coffee from the cooling compartment into the stoner or cleaner.
Fig. 20 is a perspective view typically illustrating the connection between the respective armatures and the levers operated thereby.
Figures 4, 5, 6, 13:
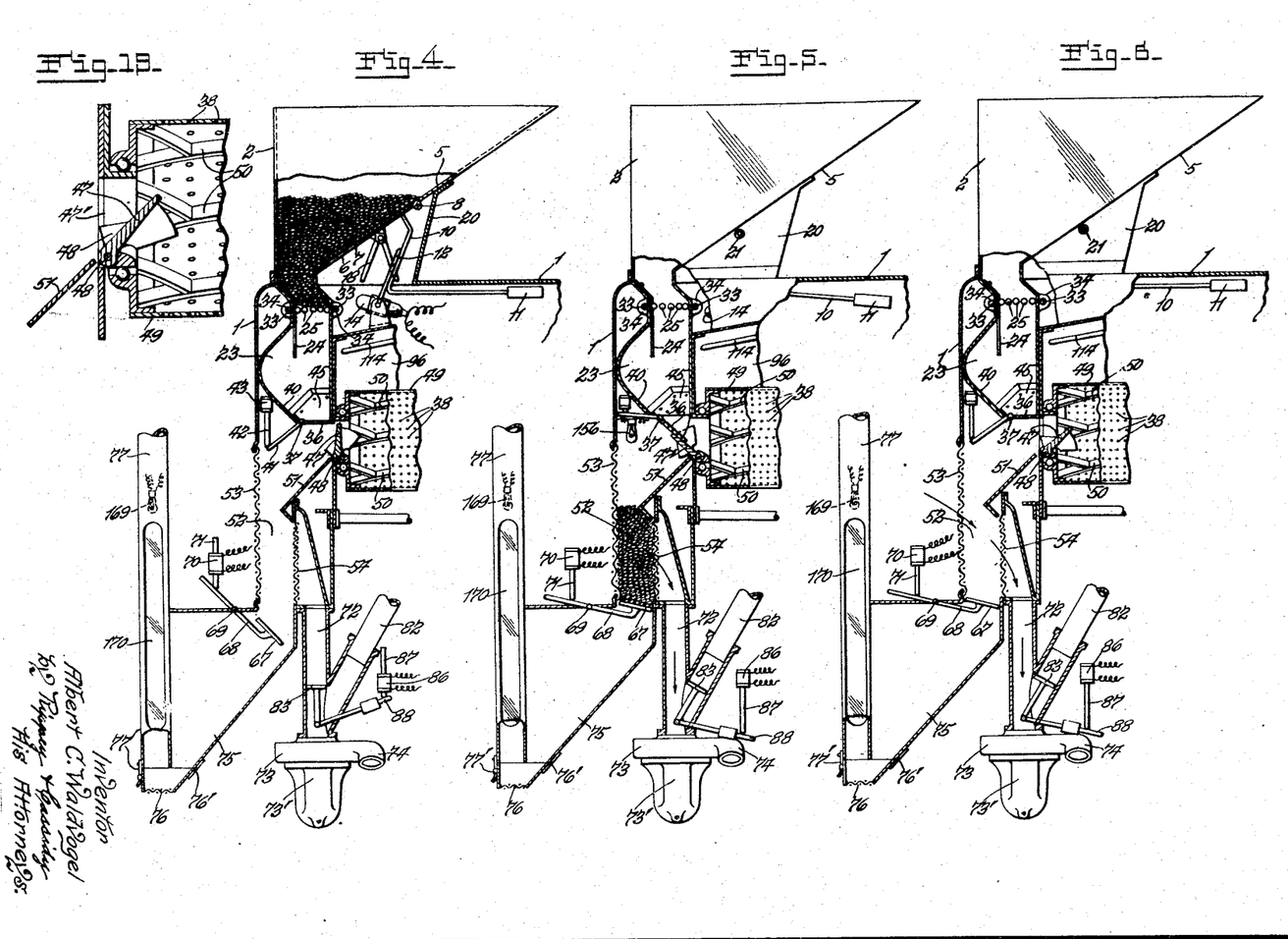
Fig. 6 is a view similar to Fig. 5 with the exception that the respective valves are shown in position to support coffee in the receiving compartment and to discharge coffee from the roaster into the cooling compartment and to support coffee in the cooling compartment.
Fig. 13 is an enlarged sectional view on the line 13—13 of Fig. 12.

A typical connection of the various armatures hereinbefore mentioned, with the arms or levers controlled thereby, is illustrated in detail in Fig. 20. As there shown, an electro-magnet 86' operates in one direction an armature 87' when said magnet is energized. A lever 88' has thereon a counterweight 89' and extends for sliding movements through a member 90' rotatively supported by the armature 87'. Thus, when the armature 87' moves upwardly and downwardly, the arm or lever 88' will be oscillated thereby and will slide through the rocking member 90', as required in such movements. This typically illustrates the connection of the various armatures with the parts controlled thereby.

The roaster 38 is rotatively supported at its open end by a bearing 94 and at the opposite end by an axle member 95 journalled in the wall 96 of a part of the housing or casing that encloses the roaster.

The axle member 95, and thereby the roaster, is rotated by a sprocket or gearing connections 97 driven by conventional gearing operated by a conventional electric motor 98. The shaft 99 of the motor operates a blower 100 in a housing 101. A pipe 102 has one end opening into the blower housing 101 and its opposite end opening into the housing enclosing the roaster 38 so that, when the blower 100 operates, it will draw air and fumes and chaff from the housing containing the roaster 38 and discharge the same through a pipe 103 into a receptacle 104. A pipe 105 has one end extending downwardly into the receptacle 104 opposite the open end of the pipe 103 and has a baffle 106 in the receptacle 104 below and spaced from the lower open end of the pipe 105 in the receptacle 104. Thus, the air and chaff are driven into the receptacle 104 spirally and are circulated therein in a cyclonic manner, causing the air and fumes to enter the pipe 105 while the baffle 106 causes the chaff to drop and settle into the bottom portion 107 of the receptacle 104. The fumes are discharged to the outside through the pipe 105 while the chaff is retained in the lower end portion 107 of the receptacle, which may be opened from time to time to remove and dispense with the chaff and waste.

A burner 108 is mounted in the roaster compartment below the rotary roaster 38 and receives gas through an air mixer tube 109. A gas supply pipe 110 opens through an air mixer 111 into the tube 109 and is equipped with an adjustable valve 112 to regulate the amount of gas passing from the pipe 110 into the tube 109. The pipe 110 receives gas from a source of supply through a thermostatic valve 113 to which is connected a conventional thermostatic device 114 extending into the housing containing the rotary roaster 38 and the burner 108 so as to be operated under the influence of the heat in said housing to reduce the amount of gas passing into and through the pipe 110 when the temperature in the housing containing the roaster and the burner rises above a predetermined degree, and to increase the amount of gas passing through the pipe 110 to the burner when the heat within said housing drops below the desired degree. Thus, the valve 113 is automatically operated independently while the remaining mechanisms of the invention operate in a timed relationship, as heretofore indicated and as more specifically described hereinafter.

The thermostatic valve is provided with a conventional setting device 115 whereby said valve may be set or adjusted so that the thermostatic connection 114 will operate it at the proper time and under the proper heat conditions. By setting the device 115 in different adjusted positions, the amount of fuel gas passing to the burner 108 may be increased or reduced as desired, thereby increasing or reducing and controlling the amount of heat applied to the rotary roaster 38 in the roaster housing.

In Fig. 8, butterfly valves are shown for controlling the flow of air through the pipes 72 and 82. These butterfly valves take the place of the valve 83. A butterfly valve 116 is rigidly attached to a rocking rod 117 extending across the pipe 72, and a butterfly valve 118 is rigidly attached to a rocking rod 119 extending across the pipe 82. An electro-magnet 120 has an elongated armature 121 operating through a guide lug 122 rigid with the pipe 72.

Collars 123 are rigid on the armature 121 and have sliding pivotal connection 124 with arms 125 attached to the rods 117 and 119, respectively. When the electro-magnet 120 is energized, the armature 121 is moved upwardly, thereby simultaneously opening the valve 118 and closing the valve 116. This permits the blower 73 to draw air through the pipe 82 and through the pipe 77, with the results already described, and prevents the blower 73 from drawing air through the pipe 72. A spring 126 is mounted on the armature 121 between the lug 122 and the upper collar 123, and is compressed when the armature 121 is raised by the electro-magnet 120, as described. When the magnet 120 is de-energized, the spring 126 immediately acts to move the armature 121 downwardly, thereby simultaneously opening the valve 116 and closing the valve 118, causing the blower to draw air through the cooling compartment 52 and preventing the blower from drawing air through the pipe 82. The magnet 120 is energized and de-energized in a timed relationship so that air is drawn through the pipe 72 during the time that coffee is supported in the cooling compartment by the wall 67. The valve 116 is closed and the valve 118 is opened at the proper time after the coffee has been discharged from the cooling compartment into the stoner compartment 75, so that the blower 73 will draw the coffee upwardly through the pipe 77 in the manner and with the results already described.

Figures 14, 15, 16, 17, 18:
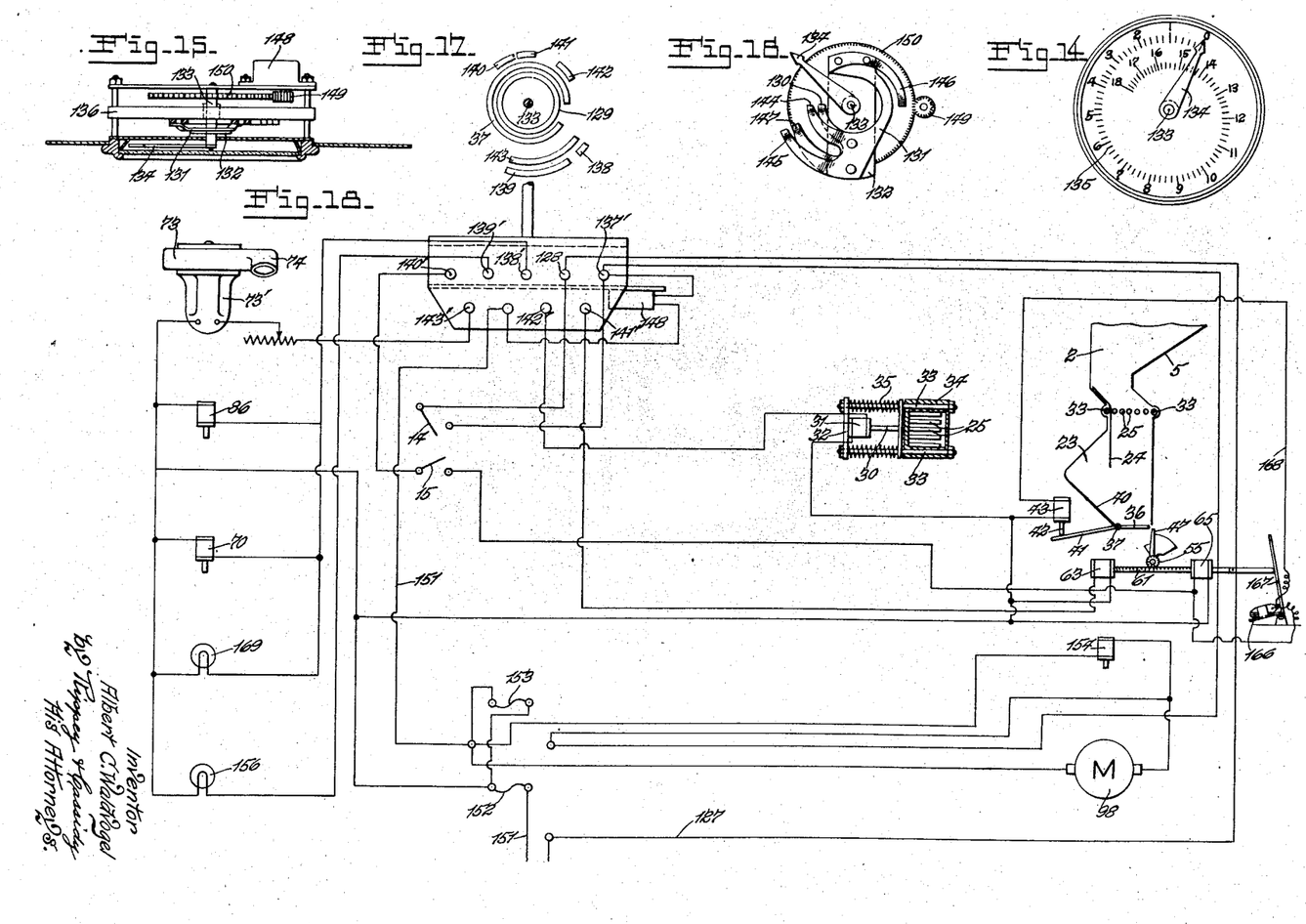
Figs. 14, 15, 16 and 17 are views showing details and features of the electrical mechanism and for timing the operation of the different devices comprised within the invention.
Fig. 18 is a view mostly diagrammatic illustrating the electrical connections for operating the different devices in timed relationship, the valve device controlling discharge of the coffee from the receptacle or hopper into the receiving compartment being seen from two positions for clarity.

The timing switch controlling the automatic electrical operation of the various electrical devices included in the invention is specifically illustrated in Figs. 15, 16 and 17, and diagrammatically shown in Fig. 18. The ground wire 127 of the electrical circuit has a connection 128 with an annular terminal 129, and is constantly engaged by the brush finger 130 of the switch unit 131 attached to an insulation support 132 secured on a rotary spindle 133, which also supports a pointer 134 cooperating with a time indicating dial 135. The terminal 129 is attached to an insulation support 136, as are the terminals 137, 138, 139, 140, 141, 142 and 143. The terminal 137 is engaged by the brush finger 144; the terminals 138 and 139 are engaged alternately and intermittently by the brush finger 145; the terminals 140, 141 and 142 are engaged successively and intermittently by the brush finger 146; and the terminal 143 is engaged intermittently by the brush finger 147; all of which are a part of the unit 131.

A synchronous motor 148 connected with the electrical circuit of the apparatus rotates a small pinion 149 (Fig. 15) which engages and rotates a relatively large gear 150 attached to the rotary spindle 133, so that said motor will rotate the brush switch unit 131 in a counter-clockwise direction, as seen in Fig. 16.

The connections of the circuit wires to the various terminals are diagrammatically illustrated in Fig. 18, and are indicated by the same reference numerals that are applied to said terminals with exponents, as, for instance, the circuit wires are connected with the terminal 137 through a connection 137', and so on. The motor 148 is electrically connected with the terminal 137.

The hot wire 151 through fuse connection 152 and fuse connection 153 leads to and energizes the motor 148 which rotates the switch unit 131. The switch 14 controls the circuit for operating the motor 148, so that said motor can operate only when the switch 14 is closed and during the time that the brush finger 144 is in contact with the arcuate terminal 137. As shown, the terminal 137 has its ends separated by an intervening space. The motor 148 will continue to operate so long as the switch 14 remains closed. When the switch 14 is opened to break the circuit, the motor 148 will continue to operate until the brush finger 144 moves into the space between the ends of the terminal 137 and, at that time, the motor 148 will stop because there is no electrical energy supplied thereto. As shown, all of the brush fingers 145, 146 and 147 are out of contact with their respective terminals when the brush finger 144 is out of contact with the terminal 137 and is in the space between the ends of said terminal, as a consequence of which the motor 98, also controlled by the electrical circuit through the brush 144 and the terminal 137, will be stopped; and the conventional magnetic valve 154 controlling the supply of fuel gas to the burner 108 through the pipe 155 will be closed. At this time, operation of all of the operating parts of the machine is automatically stopped because all of the brushes other than the brush 130 (Fig. 16) are out of contact with their respective terminals with which they cooperate. The machine will be automatically stopped in this manner when all of the green coffee has been discharged from the hopper 2, thereby permitting the lever 10 to be operated by its weight 11 to open the switch 14, as heretofore described; or the machine may be stopped optionally by opening the switch 14 by turning the rod 16 manually.

To start the machine, a proper amount of green coffee is placed in the hopper 2 and is supported by the rods 25. The weight of the green coffee in the hopper 2 depresses the plate 7 and moves the lever 10 away from the part 12 so that, when the frame 13 is turned by manual operation of the rod 16 to close the switches 14 and 15, said switches will remain closed until all, or practically all, of the green coffee has been discharged from the hopper 2. When weight of the green coffee is removed from the plate 7, the lever 10 will be operated by the weight 11 to open the switches 14 and 15, after which the machine will stop when the several brush fingers 144, 145, 146 and 147 have passed out of contact with their respective terminals, as already described.

After the hopper 2 has been filled with green coffee and the machine has been started by closing the switch 14, the motor 148 rotates the switch unit 131 and first engages the brush finger 144 with the terminal 137 and next engages the brush finger 146 with the terminal 142 which is in circuit with the electro-magnet 31 which withdraws the rods 25 from across the chute 22 and permits a charge or batch of green coffee to enter the compartment 23. The brush finger 146 engages the terminal 142 for only a short interval, just long enough to permit the desired amount of green coffee to enter the compartment 23, and then said brush finger passes out of contact with the terminal 142, as a consequence of which the electro-magnet 31 is de-energized and the springs 35 quickly operate in the manner heretofore described to move the rods 25 inwardly to their closed positions in which they will support the green coffee in the hopper 2.

Next, after a comparatively short interval, the brush finger 146 is moved into contact with the terminal 141 and, at the same time, the brush fingers 145 and 147 engage their respective terminals 139 and 143.

When the brush finger 146 engages the terminal 141, it closes the electrical circuit to and energizes the electromagnet 63, which moves the rack 61 toward the left, as seen in Figs. 12 and 18, and thereby swings the gate valve 47 to inclined position in which it extends into the roaster (Fig. 6) in approximate continuation of the inclined wall 51, so that any coffee contained in the roaster will be discharged therefrom, since the roaster is being rotated by its motor 98 and the flights 50 in the roaster discharge the coffee onto the gate valve 47. At the same time that the electromagnet 63 is energized to move the gate valve 47 to its inclined coffee discharging position, the motor 73' for the blower 73 is operated through the circuit controlled by the brush 147 and the terminal 143, creating a current or draft of air through the cooling compartment 52 to cool the roasted coffee, and thence through the blower, because, at this time, the valve 83 closes the pipe 82 and leaves the pipe 72 open. At the same time, a lamp 156 in the upper portion of the cooling compartment is lighted through the circuit controlled by the brush finger 145 and the terminal 139. This lamp is provided to permit inspection of the roasted coffee contained in the cooling compartment.

After a short interval, the brush finger 146 moves out of contact with the terminal 141 and almost immediately contacts the terminal member 140. When the finger 146 moves out of contact with the terminal 141, the circuit to the electro-magnet 63 is immediately opened and said electro-magnet is immediately de-energized. A spring 157 (Fig. 12) is mounted on a rod 158 which has one end attached to the armature 66. The ends of the spring 157 engage washers 159 and 160, respectively, loosely mounted on the rod 158. Nuts 161 and 162 attached to the rod 158 engage the washers 159 and 160, respectively. The spring 157 is enclosed within a shell 163. The washer 159 seats against a shoulder 164 and the washer 160 seats against the end wall 165 of the shell 163. When the electro-magnet 63 is energized and operates the rack 61 as described, said rack moves the rod 158 toward the left as seen in Fig. 12, causing the washer 160 to compress the spring 157 because the washer 159 cannot move with the rod at this time. Therefore, when the electro-magnet 63 is de-energized as described, the spring 157 which had been compressed acts immediately to move the rack 61 to its intermediate position in which the gate valve 47 extends vertically (Fig. 4) and then, the electro-magnet 65 having been energized by movement of the brush 146 into contact with the terminal 140, said electro-magnet 65 continues uninterrupted movement of the rack 61 toward the right, as seen in Fig. 12, compressing the spring 157 by the washer 159 and, at the same time, swinging the gate valve 47 to inclined position (Fig. 5) in approximate alinement with the inclined wall 40.

A switch 166 mounted on a swinging support 167 controls the circuit 168 to the electro-magnet 43 so that, when said switch is open (Fig. 18), the electro-magnet 43 is unenergized. When the rod 158 is pushed beyond its intermediate position by the armature 66, said rod 158 moves the support 167 far enough to close the switch 166 and thereby close the circuit 168 to the electromagnet 43, with the result that said electromagnet is energized and its armature 42 is moved upwardly. Upward movement of the armature 42 operates the arm 41 and thereby the valve 36 so as to swing said valve 36 to inclined position against the upper surface of the wall 40 and the upper surface of the gate valve 47. This causes or permits the green coffee to flow from the compartment 23 along the inclined gate valves 36 and 47 into the continuously rotating roaster 38. The gate valves 36 and 47 are held in the overlapping inclined positions (Fig. 5) described during the time that the brush finger 146 remains in contact with the terminal 140. When the brush finger 146 passes out of contact with the terminal 140, the circuit to the electro-magnet 43 is opened, the armature 42 drops downwardly by gravity and closes the valve 36. At the same time, the circuit to the magnet 65 is opened and said magnet is de-energized. When the magnet 65 is de-energized, the spring 157 acts immediately and quickly to move the rod 158, and thereby the armature 66 and the rack 61, toward the left, as seen in Fig. 12, with the result that the switch 166 is moved by gravity or otherwise to open position, and with the further result that the rack 61 moves the gate valve 47 to its upright or vertical intermediate position (Fig. 4) in which it prevents the coffee contained in the continuously rotating roaster from being discharged from the roaster.

At this time, the cooling compartment 52 contains a batch of roasted coffee that is being cooled by operation of the blower 73 drawing cool air through the cooling compartment and the coffee contained therein, and through the pipe 72.

After the roasted coffee contained in the cooling compartment 52 has been cooled sufficiently, the brush finger 145 moves out of contact with the terminal 139 and thereby opens the circuit to the lamp 156. Then, almost immediately or after a very short time, the brush 145 moves into contact with the terminal 138 and closes the circuit to the electro-magnets 70 and 86 and to a lamp 169 located close to a transparent window (not shown) in the pipe 77. When the electro-magnets 70 and 86 are energized (Fig. 4), their respective armatures 71 and 87 are moved upwardly. Upward movement of the armature 71 operates the lever 68 which moves the lower end wall 67 of the cooling compartment 52 downwardly to open position and causes or permits the coffee to flow from the cooling compartment 52 into the stoner chamber 75. And, when the magnet 86 is energized, it moves its armature 87 upwardly and thereby operates the lever 88 to move the valve 83 from the pipe 82 to the pipe 72. This prevents the blower 73 from drawing air through the cooling compartment and through the pipe 72, and causes the blower to draw air through the pipe 82, the compartment 79 and the pipe 77, with the result that the cooled coffee which had been deposited in the stoner chamber 75 as described is drawn upwardly through the pipe 77 and is discharged against the baffle 80 and caused to drop into the lower part of the chamber 78 while waste matter, such as chaff, etc., is drawn through the pipe 82 and discharged by the blower through the outlet 74. The suction of the air through the pipe 82 cooperates with the weight 93 to hold the closure wall 90 in closed position at the lower end of the chamber 78.

When the brush 145 passes out of contact with the terminal 138, the circuit to the electro-magnets 70 and 86 and to the lamp 169 is opened, with the result that said magnets are de-energized and the light of the lamp is extinguished. The armatures 71 and 87 then drop or move downwardly. The armature 71 operates the lever 68 to move the closure wall 67 from open position (Fig. 4) to closed position (Figs. 5 and 6) preparatory to receiving and supporting another batch of roasted coffee in the cooling compartment. And the armature 87, which may be assisted by a weight 89 or equivalent device, moves downwardly to operate the lever 88, and thereby move the valve 63 from the pipe 72 (Fig. 4) to the pipe 82 (Figs. 5 and 6), thus opening the pipe 72 and closing the pipe 82. At about the same time that the brush 145 moves out of contact with the terminal 138, the brush 147 moves out of contact with the terminal 143 and thereby opens the circuit to the motor 73' and causes said motor to stop until about the time that another batch of roasted coffee is received within the cooling compartment 52. When the suction through the pipe 82 and from the chamber 78 is thus terminated, the weight of the coffee in said chamber 78 may open the closure wall 90 and cause or permit the coffee to flow from the chamber 78 through the chute 4 into the bin 3. At this time all of the brushes 144, 145, 146 and 147 are out of contact with their respective terminal members and all of the circuits controlled thereby are open; so that, at this time, if the switch 14 is open, the machine will stop. But, if the switch 14 remains closed, and it does remain closed when the plate 7 is held down by the weight of green coffee in the hopper 2, the machine will continue to operate and said brush fingers will be moved into contact with their respective terminal members in timed relationship, specifically described above; and the machine will continue to function automatically.

As explained before, the switches 14 and 15 are mounted on the same movable support 13, and are closed simultaneously and opened simultaneously by movement of said support from one position to another. The switch 14 is in parallel with its connected terminal members 129 and 137, and the switch 15 is in series with its cooperating terminal members 129 and 140. Therefore, the mechanisms in the circuit in which the switch 14 is mounted will continue to operate in timed relationship until the brushes 144, 145 and 147 pass out of contact with their respective terminal members 137, 143 and 138. But, when the switch 15 is open, the circuit leading to the terminal member 140 is opened and it is impossible to energize either of the electro-magnets 43 or 65. As long as the electro-magnet 43 remains unenergized, the valve 36 is held closed and no green coffee can be discharged from the compartment 23 into the roaster, although the roaster continues to rotate until the motor operating the same is stopped. Also, so long as the electro-magnet 65 remains unenergized, as it does when the switch 15 is open, the rack 61 will not be operated thereby. This leaves the rack 61 in its intermediate position in which the gate valve 47 is vertical. Thus, it will be seen that the principal duty or function of the switch 15 is to provide for or assure that no green coffee will be discharged into the roaster when said switch is open, although the roaster will continue to operate until the coffee contained therein has been roasted and discharged. Further, the switch 15, by controlling the delivery of green coffee into the roaster, assures that no coffee will be contained therein after the machine has been idle as, for instance, through the night. Further, when the machine is again started after having remained idle for a time, no green coffee will be discharged into the roaster until the roaster has been preheated, because the valves 36 and 47 will not be operated to discharge coffee into the roaster until the brush 146 has moved into contact with the terminal member 140, which is about three-fourths of a revolution of the spindle 133 and the brush unit 131, lasting through several minutes of time.

The pointer 134 cooperates with the dial 135 and, as seen in Fig. 14, rotates in a counter-clockwise direction. The numerals from "0" to "18" contained on the dial represent minutes so that, in the specific arrangement shown, the pointer makes one complete revolution in about fourteen and one-half minutes. Of course, the dial operation may be varied and the speed of rotation of the pointer may also be varied without departure from the invention. The pointer 134 (Fig. 14) is at "0" position and the brushes 145, 146 and 147 have just contacted with their respective terminal members 139, 141 and 143, thereby discharging coffee from the roaster 38 into the cooling compartment 52 through the circuit controlled by the brush 146 and the terminal member 141; starting the motor 73' for the blower 73 through the circuit controlled by the finger 147 and the terminal member 143; and lighting the lamp 156 through the circuit controlled by the finger 145 and the terminal member 139. Considering that the pointer (Fig. 14) is rotating counter-clockwise, about the time that said pointer extends across the numeral "18" on the minute dial, the brushes 144, 145 and 147 move out of contact with their respective terminal members 137, 139 and 143, thereby opening the circuits to stop the machine after the switch 14 has been opened. But, if the switch 14 remains closed, the machine continues to operate through the different cycles that have been described. The machine continues to operate after the switch 14 has been opened until the brushes 144, 145 and 147 move out of contact with their respective terminal members which, as stated, is at the time the pointer 134 extends across the minute designation "18" on the dial.

By the foregoing operations, the roaster 38 has been emptied, the last batch of roasted coffee passing through the roaster has been cooled in the cooling compartment and discharged from the cooling compartment into the stoner chamber 75, and the blower 73 has caused the latch batch of roasted and cooled coffee to be delivered into the chamber 78 while the valve 36 remains closed and supports a batch, or partial batch, of green coffee in the compartment 23. At this time, all of the remaining circuits have been opened and the pointer extends across the minute designation "18" on the dial. Also, at this time, the valve 154 has been closed to prevent movement of fuel gas through the pipe 155 to the burner 108.

When the machine is again started, the switch 14 is closed, thereby opening the valve 154 to permit the passage of gas through the pipe 155 to the burner 108. The gas at the burner 108 is ignited and the flame at said burner preheats the roaster 38 preparatory to receiving a batch of green coffee to be roasted. At the same time that the valve 154 is opened, the motor 98 is operated to rotate the roaster 38 and operate the blower 101; and the motor 148 is operated to rotate the unit 131 and the pointer 134. Still considering the pointer 134 (Fig. 14) as rotating in a counter-clockwise direction from its starting position across the minute designation "18", no green coffee will be discharged into the roaster 38 from the compartment 23 until the pointer has approximately reached the minute designation "1" on the dial. At about the time that the pointer 134 reaches the minute designation "1" on the dial, the gate valve member 47 is swung to its outwardly inclined position in approximate alinement with the inclined wall 40 of the compartment 23, and immediately thereafter the gate valve 36 is opened by the energized electro-magnet 43 and a batch of green coffee is discharged into the preheated roaster 38. Thereafter, the machine operates automatically through the various cycles heretofore described and until stopped by one or another of the expedients disclosed or suggested for that purpose.

It is now apparent that practically the only variable factor in the operation of this machine is the variation in the amount of fuel gas passing to the burner and the consequent variation in the degree of heat applied to the roaster by the burner. The supply of gas to the burner 108 through the pipe 155 is automatically controlled by a thermostatic valve equipped with the setting device 115. This setting device 115 provides means for regulating the heat applied to the roaster as required to roast properly different kinds of coffee such, for instance, as dry coffee or washed coffee, or coffees containing different amounts of moisture. When coffee is being roasted, there is a time or point at which the coffee pops. By observing the position of the pointer 134 with respect to the dial 135, the popping point may be noted and the setting device 115 may be moved to different adjusted positions to vary the amount of heat applied to the roaster by the burner, and thereby cause different kinds of coffee to pop after being contained in the roaster the same length of time. Thus, certain kinds of coffee should be contained in the roaster and heated for about three-quarters of a cycle or rotation of the pointer 134. When the first batch of coffee is delivered into the roaster, the operator, by observing the dial, will note the point or time at which the coffee begins to pop and will adjust the setting device 115 accordingly so as to obtain what the operator knows to be the best results.

The invention may be varied widely within the scope of equivalent limits without departure from the nature and principle thereof. I contemplate such equivalent variations as may be desirable, and what I claim and desire to secure by Letters Patent is:

1. In a coffee roasting apparatus having a hopper, a rotary roaster, and a compartment for receiving coffee from said hopper for delivery into said roaster; a gate valve for supporting coffee in said compartment, a gate valve having an intermediate position for retaining coffee in said roaster, and mechanisms coordinated for operating said gate valves in timed relationship in which said second gate valve is first moved from said intermediate position to a position to conduct coffee from said roaster and then to a position to conduct coffee into said roaster, and in which said first gate valve is then moved to open position overlapping said second gate valve to conduct coffee from said compartment into said roaster and is then moved to a position to close said compartment, and said second gate valve is then moved to said intermediate position to retain said coffee in said roaster.

2. In a coffee roasting apparatus having a hopper, a rotary roaster, a compartment for receiving coffee from said hopper for delivery into said roaster, and mechanism for delivering measured quantities of coffee from said hopper into said compartment; an element for supporting said measured quantities of coffee in said compartment, a second element having an intermediate position to retain coffee in said roaster, coordinated mechanisms for operating said elements in timed relationship in which said second element is first moved from said intermediate position to a position to conduct coffee from said roaster and then to a position to conduct coffee into said roaster, and in which said first element is then moved to overlap said second element and to conduct coffee from said compartment toward said roaster and is then moved to a position to close said compartment, and said second element is then moved to said intermediate position to retain said coffee in said roaster, and devices controlling said coordinated operation of said mechanisms.

3. In a coffee roasting apparatus, a hopper for containing green coffee, a rotary roaster having a combined inlet and discharge passage, elements controlling delivery into said roaster of measured quantities of green coffee from said hopper, a device for guiding said green coffee into and for discharging roasted coffee from said roaster through said passage, mechanism for rotating said roaster, mechanism for cooling and then cleaning the roasted coffee discharged from said roaster, electrical devices for operating said elements and said mechanisms, a switch controlling operation of said mechanisms, a pivoted element supported by said hopper for operating said switch to and holding the same in open position to prevent operation of said elements and said mechanisms, and a device operated by the weight of coffee in said hopper for moving said last named element to and holding the same in a position to permit said switch to be closed and remain closed when said hopper contains a predetermined amount of green coffee.

4. In a coffee roasting apparatus, a rotary roaster having a combined inlet and outlet opening, a gate supported at said opening for swinging movements from an intermediate position to retain coffee in said roaster to an inclined position into said roaster to conduct coffee therefrom and to an inclined position away from said roaster to conduct coffee into said roaster and then to said intermediate position, mechanism for operating said gate sequentially to said several positions as aforesaid, and a flange in connection with one edge of said gate preventing lodgment of coffee beans between the edge of said gate and the wall of said opening when said gate is in any of said positions.

5. In a coffee roasting apparatus, a rotary roaster having a combined inlet and outlet opening, walls forming a receiving compartment for green coffee to be delivered into said roaster, a valve for retaining coffee in said compartment, a gate supported at said opening for swinging movements from an intermediate position to retain coffee in said roaster to an inclined position into said roaster to conduct coffee therefrom and to an inclined position away from said roaster to conduct coffee into said roaster and then to said intermediate position, mechanism for operating said gate sequentially to said several positions as aforesaid, a flange in connection with one edge of said gate preventing lodgment of coffee beans between the edge of said gate and the wall of said opening when said gate is in any of said positions, a hopper for containing green coffee for delivery into said receiving compartment, means for cooperating said valve with said gate to conduct coffee from said compartment to said gate, and mechanism controlled in part by green coffee in said hopper for controlling operation of said roaster and said gate.

6. In a coffee roasting apparatus having a compartment for receiving measured quantities of coffee, a rotary roaster having a combined inlet and outlet opening, a gate supported at said opening for swinging movements from an intermediate position to retain coffee in said roaster to an inclined position into said roaster to conduct coffee therefrom and to an inclined position away from said roaster to conduct coffee into said roaster and then to said intermediate position, mechanism for operating said gate sequentially to said several positions as aforesaid, a flange in connection with one edge of said gate preventing lodgment of coffee beans between the edge of said gate and the wall of said opening when said gate is in any of said positions, a hopper for containing green coffee for delivery into said compartment, a valve controlling discharge of coffee from said compartment onto said gate, mechanism controlled in part by green coffee in said hopper for controlling operation of said roaster and said gate, and manual means for controlling operation of said mechanism to start and stop the same.

7. In a coffee roasting apparatus, a hopper, a rotary roaster having an inlet opening for the passage of coffee into said roaster, a gate valve at said opening movable to positions to conduct coffee into said roaster through said opening and to close substantially the opening during the roasting of the coffee in said roaster and to conduct the roasted coffee from said roaster, and coordinated mechanisms for moving said gate valve to said positions in proper sequences aforesaid.

8. In a coffee roasting apparatus, a compartment for containing coffee to be roasted and having an outlet, a rotary roaster having an inlet opening for the passage of coffee from said outlet from said compartment into said roaster and for the discharge of roasted coffee from said roaster, a gate valve at said opening movable to positions to conduct coffee from said compartment into said roaster through said opening and then to close substantially said opening during the roasting of the coffee in said roaster and then to conduct the roasted coffee from said roaster, an element cooperating with said gate valve for conducting coffee from said compartment to said gate valve and for opening and closing said outlet, and coordinated mechanism for moving said gate valve to said positions sequentially as aforesaid.

9. In a coffee roasting apparatus, a compartment for containing coffee to be roasted and having an outlet, a rotary roaster having an inlet opening for the passage of coffee from said outlet from said compartment into said roaster and for the discharge of roasted coffee from said roaster, a gate valve at said opening movable to positions to conduct coffee from said compartment into said roaster through said opening and then to close substantially said opening during the roasting of the coffee in said roaster and then to conduct the roasted coffee from said roaster, an element cooperating with said gate valve for conducting coffee from said compartment to said gate valve and for opening and closing said outlet, coordinated mechanism for moving said gate valve to said positions sequentially as aforesaid, and means connected with said gate valve preventing the lodgment of coffee beans between a margin of said gate valve and a wall of said opening.

10. In a coffee roasting apparatus, a rotary roaster, mechanism for delivering into said roaster green coffee to be roasted and for conducting roasted coffee from said roaster, a cooling compartment having reticulated walls and adapted to receive the roasted coffee discharged from said roaster, means for supporting the roasted coffee in said cooling compartment and for discharging the cooled roasted coffee from said compartment, blower mechanism for inducing a cooling draft of air through the roasted coffee in said compartment and subsequently removing foreign substances from the roasted coffee and discharging said foreign substances, means forming passages opening from said roaster into said cooling compartment and communicating with the roasted coffee discharged from the cooling compartment respectively, and mechanism for opening and closing said passages successively and alternately to cool the roasted coffee and to clean the cooled coffee respectively, as aforesaid.

11. In a coffee roasting apparatus, walls forming a compartment, a rotary roaster supported in said compartment and having a combined inlet and outlet opening, a hopper adapted to contain green coffee, mechanism for conducting from said hopper and into said roaster through said opening green coffee to be roasted and for discharging from said roaster through said opening the roasted coffee, a burner supported in said compartment in cooperative relation to said roaster, a pipe for conducting fuel gas to said burner, mechanism having a part extending into said roaster and controlled by the heat therein for controlling the amount of gas passing through said pipe to said burner, and devices controlled by the green coffee in said hopper controlling delivery of coffee into said roaster by said first mechanism and delivery of gas to said burner, respectively.

12. In a coffee roasting apparatus, walls forming a compartment, a rotary roaster supported in said compartment and having a combined inlet and outlet opening, mechanism for conducting into said roaster through said opening green coffee to be roasted and for discharging from said roaster through said opening the roasted coffee, a burner supported in said compartment in cooperative relation to said roaster, a pipe for conducting fuel gas to said burner, mechanism having a part extending into said roaster and controlled by the heat therein for controlling the amount of gas passing through said pipe to said burner, mechanism for withdrawing from said compartment fumes and solids detached from the coffee being roasted, means for separating the fumes from the solids after they have been withdrawn from said compartment, and devices controlled by the green coffee in said hopper controlling delivery of coffee into said roaster by said first mechanism and delivery of gas to said burner, respectively.

13. In a coffee roasting apparatus having a roaster for roasting green coffee, a cooling compartment, mechanism for discharging from the roaster the roasted coffee and for conducting the same into said cooling compartment, a stoner compartment having an opening communicating with said cooling compartment, an element for closing said opening to support hot roasted coffee in said compartment and to open said opening to permit coffee to pass from said cooling compartment into said stoner compartment, a blower, pipe connections from said blower to said cooling compartment and to said stoner compartment respectively, mechanism for opening and closing said pipes alternately and successively to cause said blower first to induce a cooling current of air through the coffee in said cooling compartment and then to remove the cooled coffee from said stoner compartment and to discharge the lighter foreign particles separated from said coffee, a hopper for supporting green coffee for delivery into said roaster, and mechanism controlled by the green coffee in said hopper controlling operation of said element and said blower and said first named mechanism.

14. In a coffee roasting apparatus having a coffee roaster, a hopper for containing green coffee to be roasted, and walls forming a passage for conducting coffee from said hopper to said roaster; a shoulder rigid with one of said walls and extending inwardly therefrom into said passage, a series of rods movable through the wall opposite from said shoulder and having free pointed ends, and mechanism for moving said rods inwardly to position in which said pointed ends extend under said shoulder and outwardly therefrom to open said passage and permit green coffee to pass from said hopper through said passage toward said roaster.

15. In a coffee roasting apparatus having a coffee roaster, a hopper for containing green coffee to be roasted, and walls forming a passage for conducting coffee from said hopper to said roaster; a shoulder rigid with one of said walls and extending inwardly therefrom into said passage, a series of rods movable through the wall opposite from said shoulder and having free pointed ends, mechanism for moving said rods inwardly to position in which said pointed ends extend under said shoulder and outwardly therefrom to open said passage and permit green coffee to pass from said hopper through said passage toward said roaster, an element for supporting green coffee in said passage preparatory for delivery into said roaster, and means for varying the amount of coffee that may pass through said passage to be supported by said element when said rods are moved outwardly as aforesaid.

16. In a coffee roasting apparatus, a rotary roaster for receiving and containing coffee to be roasted, a burner for applying heat to said roaster to roast the coffee contained therein, a compartment adapted to contain a predetermined amount of green coffee preparatory for discharge therefrom into said roaster and having an opening for the passage of coffee from said compartment toward said opening, an element for closing said opening to support coffee in said compartment, mechanism for operating said element to position to close said opening to support coffee in said compartment and to position to discharge coffee from said compartment in proper timed relationship, mechanism for operating said element to said positions to attain said functions sequentially, and devices operated by said element for preventing coffee beans from lodging between the edges of said element and adjacent portions of said compartment, thereby leaving said element freely operative.

17. In a coffee roasting apparatus having a roaster, and walls forming a passage opening into said roaster for conducting coffee into said roaster; plates in said passage supported in spaced relationship from two oppositely disposed ones of said walls, an element for opening and closing said passage, flanges on said element extending between said plates and said walls when said element is in closed position and preventing lodgment of coffee particles between the edges of said element and said walls of said passage, and mechanism for operating said element at predetermined intervals to open and to close said passage.

18. In a coffee roasting apparatus including mechanisms for roasting green coffee and then cooling the roasted coffee, and means controlling the delivery to said roasting mechanism of green coffee to be roasted and the subsequent discharge of roasted coffee from said roasting mechanism; electrical mechanism for operating the aforesaid mechanisms and said means, and switch means operated by green coffee supported for delivery to said roasting mechanism cooperating with said electrical mechanism and controlling operation of said electrical mechanism and causing said electrical mechanism to continue to operate said roasting mechanism until the final batch of coffee is discharged from said roasting mechanism and then to stop, thereby preparing said roasting mechanism to receive another batch of green coffee after the apparatus has been again started and the roasting mechanism has been preheated.

ALBERT C. WALDVOGEL.